US012699664B2

(12) United States Patent
Shalom et al.

(10) Patent No.: US 12,699,664 B2
(45) Date of Patent: Aug. 4, 2026

(54) NETWORK COMMUNICATION APPARATUS WITH MULTIPLE HOST BUS INTERFACES

(71) Applicant: Mellanox Technologies, Ltd., Yokneam (IL)

(72) Inventors: Gal Shalom, Givat-Avni (IL); Davide Rossetti, Santa Clara, CA (US); Vikramjit Sethi, Austin, TX (US); Peter Paneah, Nesher (IL); Jonathon Evans, Santa Clara, CA (US); Idan Borshteen, Akko (IL); Jason Gunthorpe, Bedford (CA)

(73) Assignee: Mellanox Technologies, Ltd, Yokneam (IL)

( * ) Notice: Subject to any disclaimer, the term of this patent is extended or adjusted under 35 U.S.C. 154(b) by 0 days.

(21) Appl. No.: 18/776,541

(22) Filed: Jul. 18, 2024

(65) Prior Publication Data

US 2026/0023701 A1 Jan. 22, 2026

(51) Int. Cl.
*G06F 13/28* (2006.01)

(52) U.S. Cl.
CPC .......... *G06F 13/28* (2013.01); *G06F 2213/28* (2013.01)

(58) Field of Classification Search
CPC ....................................................... G06F 13/28
USPC ............................................................ 710/22
See application file for complete search history.

(56) References Cited

U.S. PATENT DOCUMENTS

| | | | |
|---|---|---|---|
| 5,619,728 A * | 4/1997 | Jones ...................... | G06F 13/28 710/24 |
| 5,761,448 A | 6/1998 | Adamson et al. | |

| | | | |
|---|---|---|---|
| 6,516,352 B1 * | 2/2003 | Booth ................... | H04L 12/403 709/250 |
| 6,658,448 B1 | 12/2003 | Stefaniak et al. | |
| 7,346,702 B2 | 3/2008 | Haviv | |
| 7,467,243 B2 | 12/2008 | Rashid et al. | |
| 7,565,454 B2 | 7/2009 | Zuberi | |

(Continued)

FOREIGN PATENT DOCUMENTS

| | | |
|---|---|---|
| CN | 105704098 A | 6/2016 |
| WO | 2013048409 A1 | 4/2013 |
| WO | 2017172215 A1 | 10/2017 |

OTHER PUBLICATIONS

PCI Express® Base Specification, Revision 3.1, pp. 1-1073, Mar. 2014.

(Continued)

*Primary Examiner* — Titus Wong
(74) *Attorney, Agent, or Firm* — Meitar Patents LTD.; Daniel Kligler

(57) ABSTRACT

Network communication apparatus for connection to a computer that includes a host processor, a host memory and at least first and second root ports. The apparatus includes a network port, for connection to a packet communication network, and first and second host bus interfaces, for connection via respective first and second peripheral component buses to the first and second root ports, respectively. Packet processing logic is coupled between the network port and the first and second host bus interfaces and includes first and second direct memory access (DMA) engines to read data from the host memory via the first and second root ports, respectively, for transmission via the network port, while exposing the network port to the host computer only through the first host bus interface.

21 Claims, 4 Drawing Sheets

(56) References Cited

U.S. PATENT DOCUMENTS

| | | | |
|---|---|---|---|
| 8,271,694 B2 | 9/2012 | Sharp et al. | |
| 8,625,427 B1 | 1/2014 | Terry et al. | |
| 10,095,645 B2 | 10/2018 | Davis et al. | |
| 10,303,635 B2 | 5/2019 | Itkin | |
| 10,318,312 B2 | 6/2019 | Itkin et al. | |
| 10,387,358 B2 | 8/2019 | Oved | |
| 10,515,066 B2 | 12/2019 | Shattah et al. | |
| 10,547,491 B2 | 1/2020 | Caron | |
| 10,642,780 B2 | 5/2020 | Shuler et al. | |
| 10,691,365 B1 * | 6/2020 | Tsirkin | G06F 12/10 |
| 11,132,326 B1 * | 9/2021 | Modukuri | G06F 13/4022 |
| 11,620,245 B2 | 4/2023 | Oved et al. | |
| 11,750,418 B2 | 9/2023 | Marcovitch et al. | |
| 11,829,309 B2 | 11/2023 | Que et al. | |
| 11,940,933 B2 | 3/2024 | Burstein et al. | |
| 12,259,832 B2 * | 3/2025 | Oved | G06F 3/0655 |
| 2004/0122988 A1 * | 6/2004 | Han | G06F 13/28 |
| | | | 710/5 |
| 2008/0147904 A1 | 6/2008 | Freimuth et al. | |
| 2008/0270599 A1 | 10/2008 | Tamir et al. | |
| 2008/0288664 A1 * | 11/2008 | Pettey | H04L 12/4633 |
| | | | 710/5 |
| 2009/0031070 A1 | 1/2009 | Purcell et al. | |
| 2009/0144508 A1 | 6/2009 | Freimuth et al. | |
| 2009/0172301 A1 | 7/2009 | Ebersole et al. | |
| 2009/0276773 A1 * | 11/2009 | Brown | G06F 9/45558 |
| | | | 718/1 |
| 2010/0070677 A1 | 3/2010 | Thakkar | |
| 2010/0312941 A1 * | 12/2010 | Aloni | H04L 49/9063 |
| | | | 710/310 |
| 2011/0246724 A1 | 10/2011 | Marathe et al. | |
| 2014/0129741 A1 | 5/2014 | Shahar et al. | |
| 2014/0181454 A1 | 6/2014 | Manula et al. | |
| 2014/0185616 A1 * | 7/2014 | Bloch | G06F 9/45533 |
| | | | 370/392 |
| 2014/0281236 A1 | 9/2014 | Rash et al. | |
| 2015/0067229 A1 * | 3/2015 | Connor | G06F 13/4022 |
| | | | 710/317 |
| 2015/0180959 A1 * | 6/2015 | Bloch | H04L 67/10 |
| | | | 709/217 |
| 2016/0070598 A1 | 3/2016 | Vadkerti et al. | |
| 2016/0342547 A1 * | 11/2016 | Liss | G06F 13/4282 |
| 2017/0068640 A1 * | 3/2017 | Shahar | H04L 67/1097 |
| 2017/0364279 A1 | 12/2017 | Banerjee et al. | |
| 2018/0004703 A1 | 1/2018 | Sharma et al. | |
| 2018/0232334 A1 | 8/2018 | Oved | |
| 2019/0068431 A1 * | 2/2019 | Caron | H04N 21/234309 |
| 2021/0124590 A1 | 4/2021 | Itkin et al. | |
| 2022/0206969 A1 * | 6/2022 | Que | G06F 13/1684 |
| 2022/0358063 A1 * | 11/2022 | Oved | G06F 3/061 |
| 2022/0385598 A1 * | 12/2022 | Pismenny | H04L 49/9068 |
| 2023/0176934 A1 * | 6/2023 | Soule | G06F 9/547 |
| | | | 719/328 |
| 2023/0214341 A1 | 7/2023 | Oved et al. | |

OTHER PUBLICATIONS

Oved, "RDMA and User Space Ethernet Bonding," PowerPoint Presentation, OpenFabrics Alliance, 12th Annual Workshop, pp. 1-16, Apr. 2016.

Shochat, "Multi-PCIe Socket Network Device," PowerPoint Presentation, Netdev 2.2, The Technical Conference on Linux Networking, Seoul, Korea, pp. 1-25, Nov. 2017, as downloaded from https://slidetodoc.com/multipcie-socket-network-device-achiad-shochat-netdev-2/.

Smolyar et al., "IOctopus: Outsmarting Nonuniform DMA," Proceedings of the 25th International Conference on Architectural Support for Programming Languages and Operating Systems (ASPLOS'20), pp. 1-15, year 2020.

Pismenny et al., "Autonomous NIC Offloads," Proceedings of the 26th ACM International Conference on Architectural Support for Programming Languages and Operating Systems (ASPLOS'21), pp. 18-35, year 2021.

Shochat, "Multi-PCIe Socket Network Device," Conference Paper, Netdev 2.2, The Technical Conference on Linux Networking, Seoul, Korea, pp. 1-4, Nov. 2017.

Wikipedia, "Non-Uniform Memory Access," pp. 1-9, last edited May 20, 2019.

Lameter, "NUMA (Non-Uniform Memory Access): An Overview," ACM Queue, vol. 11, No. 7, pp. 1-12, year 2013.

Wang et al., "CC-NUMA Oriented Conflict Preventing Method for Transactional Memory," Chinese Journal of Computers, vol. 34, No. 4, pp. 676-683, year 2011.

U.S. Appl. No. 18/174,668 Office Action dated Aug. 1, 2024.

* cited by examiner

NETWORK COMMUNICATION APPARATUS WITH MULTIPLE HOST BUS INTERFACES

FIELD OF THE INVENTION

The present invention relates generally to packet network communications, and particularly to devices and methods for linking host processors to communicate over a packet communication network.

BACKGROUND

A network interface controller (NIC) typically comprises one or more ports for connection to a packet network and at least one host bus interface for connection to the peripheral component buses of one or more host processors. In modern, high-speed NICs, the ports may comprise high-speed Ethernet or InfiniBand ports, for example, while the bus interface or interfaces comprise Peripheral Component Interconnect Express (PCIe) endpoints. (In the context of InfiniBand networks, this sort of NIC is also referred to as a Host Channel Adapter, or HCA.)

Some NICs have multiple bus interfaces, which may connect to different, respective host computers or, in some cases, to the same host computer. The latter configuration is useful, for example, in interfacing with host computers having a NUMA (non-uniform memory access) architecture. Such computers comprise multiple interconnected processing nodes (also referred to as "sockets"), wherein each node comprises a central processing unit (CPU), having one or more processing cores, and a local memory. Each CPU can access both its own local memory and non-local memories, belonging to other CPUs, but local memory access is generally much faster than non-local access. A NIC with multiple bus interfaces can be configured and connected so that each NUMA node has its own bus interface, and the NIC is thus able to load data directly into and read data directly from the local memory of the CPU producing or consuming the data.

As an example of this sort of architecture, U.S. Pat. No. 11,620,245, whose disclosure is incorporated herein by reference, describes computing apparatus in which a host computer includes at least first and second host bus interfaces. A NIC includes a network port, for connection to a packet communication network, and first and second NIC bus interfaces, which communicate via first and second peripheral component buses with the first and second host bus interfaces, respectively. Packet processing logic, in response to packets received through the network port, writes data to the host memory concurrently via both the first and second NIC bus interfaces in a sequence of direct memory access (DMA) transactions.

SUMMARY

Embodiments of the present invention that are described hereinbelow provide improved network interface devices and methods for operation of such devices.

There is therefore provided, in accordance with an embodiment of the invention, a network communication apparatus for connection to a computer that includes a host processor, a host memory and at least first and second root ports. The apparatus includes a network port, for connection to a packet communication network, and first and second host bus interfaces, for connection via respective first and second peripheral component buses to the first and second root ports, respectively. Packet processing logic is coupled between the network port and the first and second host bus interfaces and includes first and second direct memory access (DMA) engines to read data from the host memory via the first and second root ports, respectively, for transmission via the network port, while exposing the network port to the host computer only through the first host bus interface.

In some embodiments, the packet processing logic is to receive an instruction from the host processor via the first host bus interface to execute a communication transaction via the network port and to transfer data in the communication transaction between the second host bus interface and the host memory. In a disclosed embodiment, the instruction is contained in a work queue element (WQE) posted by the host processor in a work queue, which is associated with the first root port, and the packet processing logic is to issue to the host processor a crossing memory key (Mkey), which links the work queue to a region in the host memory accessed via the second root port, for application by the host processor in posting the WQE.

Alternatively or additionally, the host computer includes multiple non-uniform memory access (NUMA) nodes, including first and second NUMA nodes respectively including the first and second root ports, and the packet processing logic is to receive the instruction from the host processor via the first host bus interface to execute the communication transaction via the network port on behalf of a process executing on the second NUMA node. In a disclosed embodiment, the packet processing logic is to transfer data in the communication transaction between the second host bus interface and a local memory of the second NUMA node.

In some embodiments, the first and second host bus interfaces support different, first and second host bus types. In a disclosed embodiment, the second host bus interface is to be connected to a first downstream port of a switch on the second peripheral component bus and to exchange data via the switch with a peer peripheral device connected to a second downstream port of the switch.

There is also provided, in accordance with an embodiment of the invention, a computer system, which includes a computer including a host processor, a host memory, and at least first and second root ports. A network interface controller (NIC) includes a network port, for connection to a packet communication network, and first and second host bus interfaces, for connection via respective first and second peripheral component buses to the first and second root ports, respectively. Packet processing logic is coupled between the network port and the first and second host bus interfaces and includes first and second direct memory access (DMA) engines to read data from the host memory via the first and second root ports, respectively, for transmission via the network port, while exposing the network port to the host computer only through the first host bus interface.

In some embodiments, the host processor is to submit an instruction to the packet processing logic via the first root port to execute a communication transaction via the network port and to transfer data in the communication transaction between the second root port and the host memory.

In a disclosed embodiment, the host computer includes multiple non-uniform memory access (NUMA) nodes, including first and second NUMA nodes respectively including the first and second root ports, and the host processor is to submit the instruction to the NIC via the first root port to execute the communication transaction via the network port on behalf of a process executing on the second NUMA node.

In a disclosed embodiment, the system includes a peer peripheral device and a switch including an upstream port connected to the second root port of the host computer, a first downstream port connected to the second host bus interface of the NIC, and a second downstream port connected to the peer peripheral device, wherein the second DMA engine is to exchange data via the switch with the peer peripheral device.

There is additionally provided, in accordance with an embodiment of the invention, a method for network communication, which includes connecting a network port of network interface controller (NIC) to a packet communication network. First and second host bus interfaces of the NIC are connected via respective first and second peripheral component buses to first and second root ports, respectively, of a host computer, while exposing the network port to the host computer only through the first host bus interface. Data are read by direct memory access (DMA) via both the first and second root ports from host memory of the host computer for transmission by the NIC via the network port.

The present invention will be more fully understood from the following detailed description of the embodiments thereof, taken together with the drawings in which:

DETAILED DESCRIPTION

Overview

Figure 1:
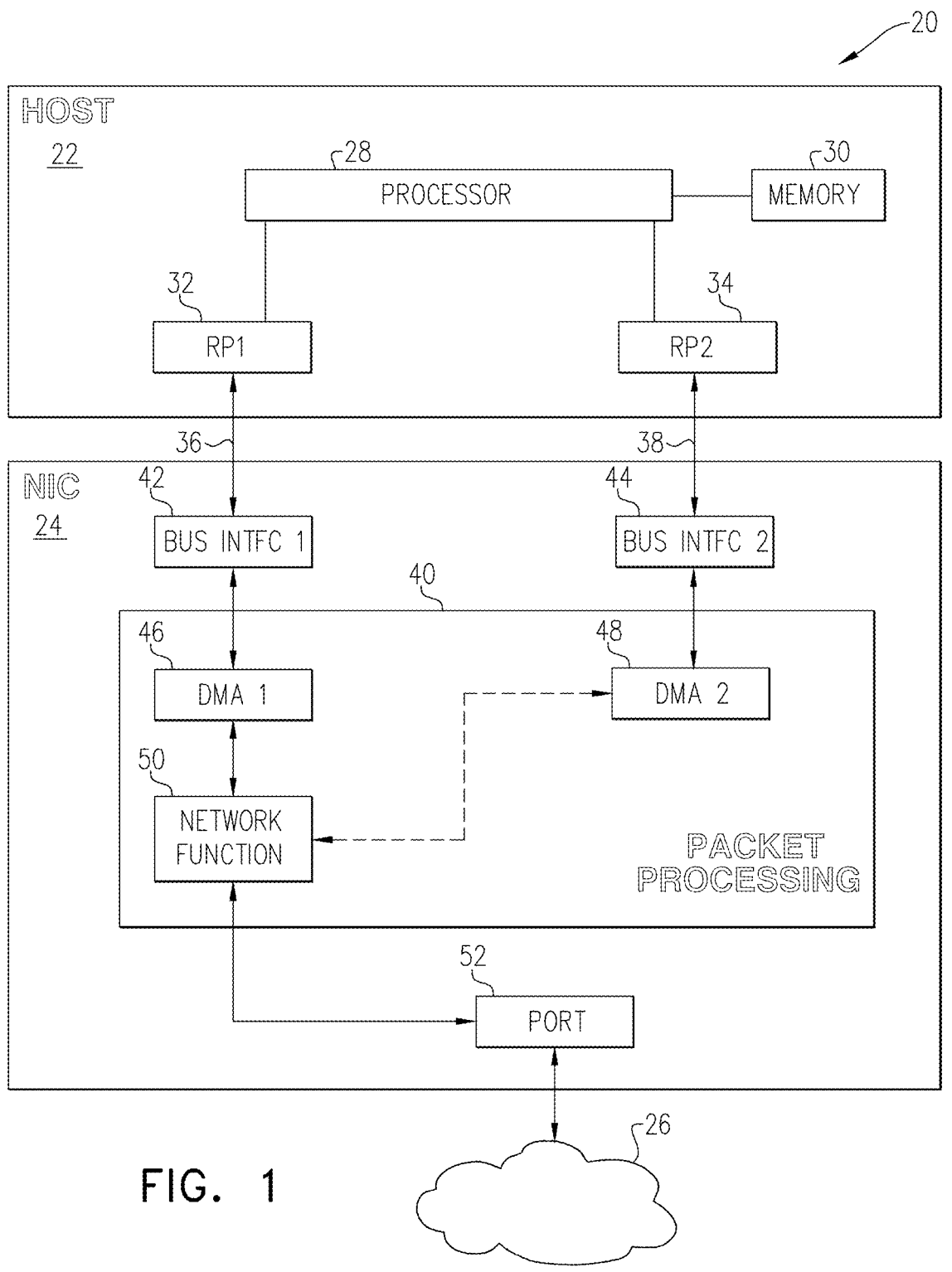
FIG. 1 is a block diagram that schematically illustrates a host computer comprising a NIC with multiple bus interfaces, in accordance with an embodiment of the invention.

Devices connected to a server often encounter asymmetrical access to memory, which can impede device performance. This asymmetry arises in scenarios such as Non-Uniform Memory Access (NUMA) or when accessing peer devices. In NUMA systems, memory access speed can vary because different memory banks are physically closer to some processors than to others. Similarly, peer-to-peer (P2P) transactions between devices can suffer from asymmetrical memory access, leading to performance bottlenecks.

The above-mentioned U.S. Pat. No. 11,620,245 addresses this asymmetry by allowing a single device, such as a NIC, to be connected by multiple host interfaces to a server, with each connection presenting itself to the host operating system as a separate, fully functional device. This approach mitigates some of the performance issues associated with asymmetrical memory access, but it burdens the host processor with the complexity of managing and synchronizing multiple devices, which can increase software overhead and reduce overall system efficiency.

Embodiments of the present invention that are described herein provide a network communication apparatus, such as a NIC, that offers a novel approach to managing asymmetrical memory access and enabling efficient peer-to-peer transactions. In the disclosed embodiments, a NIC has multiple connections to a server, but only a single connection is exposed to the host operating system as the actual network communication device. Additional connections are presented as supplementary direct memory access (DMA) engines of the NIC. This configuration simplifies the management of resources and control, reducing the need for complex software overhead associated with management and synchronization of multiple network functions.

The separation of network and DMA functions among the host connections also enables efficient management of the available bus bandwidth between the host processor and the NIC, thus avoiding bottlenecks and enhancing data transfer speed and performance. For example, when a peer device, such as a computational accelerator or a storage device, has to transfer data to or from the NIC via a peripheral component bus (for example through a PCIe switch on the bus), it is able to do so via a DMA connection that does not expose the network communication function of the NIC. Network communication traffic between the host processor and the NIC passes through another bus interface of the NIC, without competing for bus bandwidth with the peer-to-peer transfer.

To summarize, the embodiments that are described herein provide a network communication apparatus, such as a NIC, for connection to a computer that includes a host processor, a host memory and at least two root ports, for connection to different, respective peripheral component buses. The network communication apparatus includes at least two host bus interfaces, for respective connection via the peripheral component buses to the root ports. Packet processing logic in the apparatus, coupled between the network port and the host bus interfaces, comprises at least two DMA engines to read data from the host memory via the respective host bus interfaces and the root ports, for transmission via the network port, as well to write data received via the network port to the host memory. The packet processing logic exposes the network port to the host computer, however, through only one of the host bus interfaces. Details of the operation of this scheme are described below.

System Description

FIG. 1 is a diagram block that schematically illustrates a computer system 20, comprising a host computer 22 and a NIC 24, with multiple host bus interfaces 42, 44, which connects the host computer to a packet communication network 26, in accordance with an embodiment of the invention.

Host computer 22 comprises a processor 28, comprising one or more CPUs, and a host memory 30. Root ports 32 and 34 (labeled RP1 and RP2, also referred to as root complexes) connect to respective peripheral component buses 36, 38, for example PCIe buses. Buses 36 and 38 may both be of the same type, or they may be of different, respective types, supporting different bus standards and/or different data rates. Root ports 32 and 34 and the corresponding host bus interfaces 42 and 44 support the same or different host bus types as appropriate. Although host computer 22 in this example comprises two root ports 32, 34, the features described hereinbelow may similarly be implemented in host computers comprising three or more root ports.

NIC 24 comprises a network port 52, or possibly multiple network ports (not shown in the figures), for connection to network 26. For example, network 26 may comprise an Ethernet or InfiniBand switch fabric, and port 48 comprises suitable physical layer (PHY) and media access control (MAC) interface circuits for connection to the network. NIC 24 transmits and receives data packets over network 26 to and from other network nodes. Host bus interfaces 42, 44 comprise interface logic, for example PCIe interface logic, and communicate via respective buses 36, 38 with respective root ports 32, 34.

Packet processing logic 40 is coupled between network port 52 and NIC bus interfaces 42, 44. Packet processing logic 40 comprises direct memory access (DMA) engines 46 and 48, which read data from host memory 30 via bus interfaces 42, 44 and root ports 32, 34, respectively, for transmission in outgoing packets via network port 52, and similarly write data from incoming packets to the host memory. These DMA operations can take place concurrently via both of NIC bus interfaces 42, 44, in response to work queue elements (WQEs) posted by processor 28 in work queues for execution by NIC 24. Typically, packet processing logic 40 comprises digital logic circuits, which may be hard-wired or programmable and are configured to carry out the functions described herein. Additionally or alternatively, packet processing logic 40 may comprise one or more programmable processors, which are programmed in software or firmware to carry out at least some of these functions. Details of the circuits and logic that are involved in this sort of multi-bus NIC operation are described in the above-mentioned U.S. Pat. No. 11,620,245.

In the present embodiment, however, packet processing logic 40 exposes network port 52 to host computer 22 only through host bus interface 42. Specifically, a physical network function 50, which is able receive and execute instructions (in the form of WQEs) to transmit and receive packets over network 26, is made available to host computer only via bus 36. Thus, processor 28 has a single target, via root port 32, for network communications and need maintain only a single protocol stack for each protocol that is used on network 26. While the communication control flow is thus limited to bus interface 42, data flow can be channeled through both bus interfaces 42 and 44, in DMA operations carried out by both of DMA engines 46 and 48. Packet processing logic 40 internally links the DMA operations to the communication control flow, for example using memory keys as described below, to transfer outgoing and incoming packet data via the appropriate DMA engine in each case.

In alternative embodiments (not shown in the figures), host computer 22 and NIC 24 may respectively include three or more root ports and host bus interfaces. In such embodiments, too, only one of the host bus interfaces will expose the network function of the NIC, while the other host bus interfaces will expose only the respective DMA functions.

Figure 2:
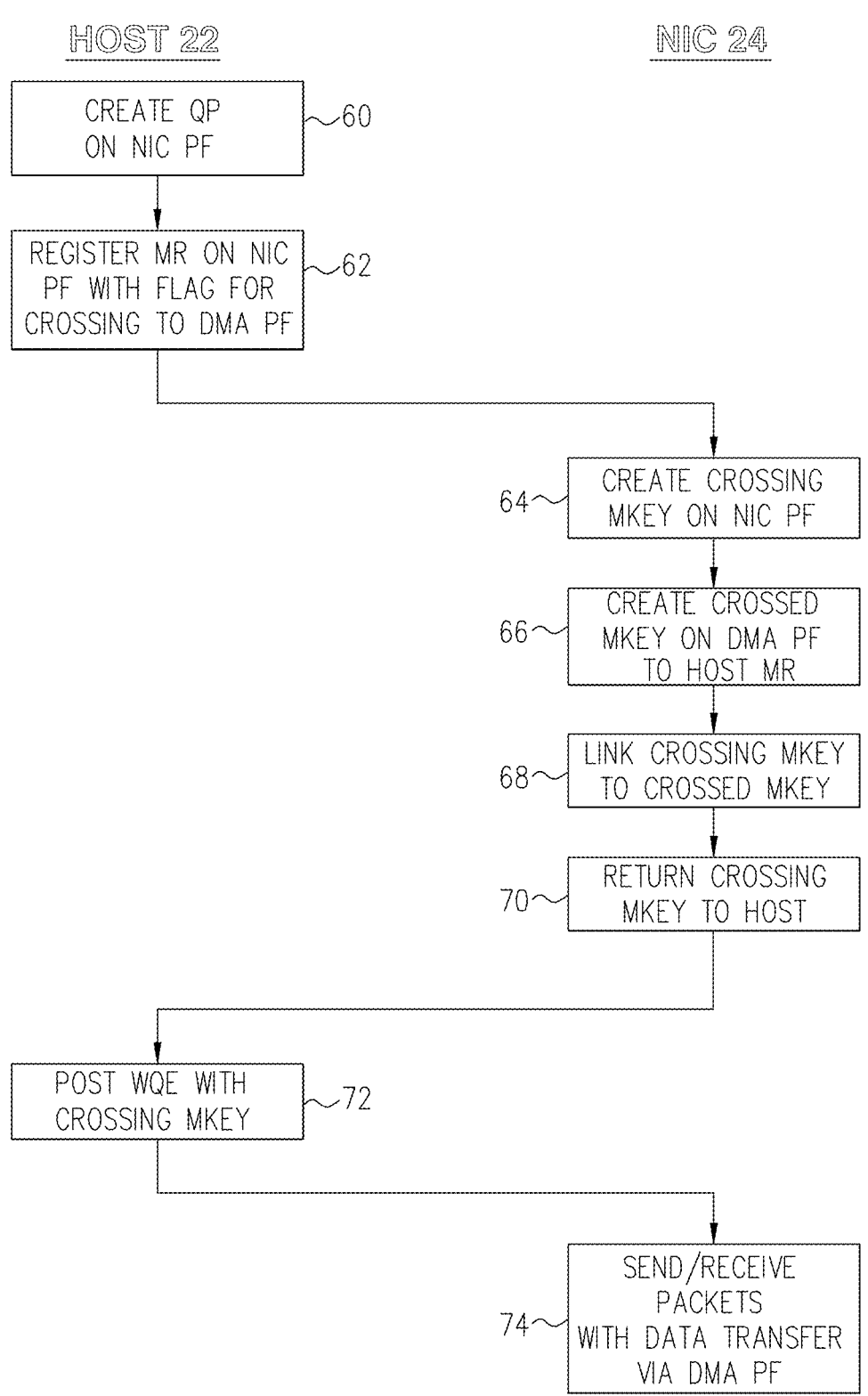
FIG. 2 is a flow chart that schematically illustrates a method for interaction between a host processor and a NIC, in accordance with an embodiment of the invention.

FIG. 2 is a flow chart that schematically illustrates a method for interaction between processor 28 in host computer 22 and NIC 24, in accordance with an embodiment of the invention.

In this embodiment, packet processing logic 40 receives instructions from processor 28 via host bus interface 42 (which exposes network function 50) to execute communication transactions via network port 52, but then transfers data in the communication transaction between host bus interface 44 (which exposes only a DMA function) and host memory 30. The instructions are contained in WQEs posted by processor 28 in a work queue that is associated with root port 32 (which connects via bus 36 with host bus interface 42). For the purpose of such transactions, packet processing logic 40 issues a crossing memory key (Mkey) to processor 28. This key, which is by processor 28 in posting such WQEs, links the work queue on root port 32 to a region in host memory 30 that is accessed via root port 34 and bus 38. This sort of crossing between memory regions and memory keys is based generally on the cross-function bridging techniques that are described in U.S. Pat. No. 11,940,933, whose disclosure is incorporated herein by reference, but applies these techniques in a novel way.

To initiate a communication transaction (in which packet data will be transferred from a target region in memory 30 to network port 52 or vice versa), the operating system of host processor 28 creates a queue pair (QP), which is directed to network function 50 of NIC 24, at a QP creation step 60. The operating system performs step 60, for example, in response to a request by an application running on host computer 22 to establish communications with an entity on network 26. Assuming bus 36 to be a PCIe bus, network function 50 is exposed via host bus interface 42 as a network "physical function" (PF), allowing host computer 22 to make use of the full range of capabilities of NIC 24. Processor 28 registers the target memory region (MR) of this QP in memory 30 with network function 50 by submitting an appropriate registration command to NIC 24, at a registration step 62. Processor 28 sets a flag in the command to indicate to NIC 24 that this memory region is to be accessed by DMA engine 48, via bus 38.

The flagged command of step 62 causes packet processing logic 40 in NIC 24 to perform several steps: The packet processing logic creates a crossing Mkey on network function 50, at a crossing Mkey creation step 64; and it creates a "crossed Mkey" on the DMA PF of DMA engine 48, at a crossed Mkey creation step 66. The crossed Mkey points to the target region for data transfer in host memory 30, as indicated by the registration command issued in step 62. Packet processing logic 40 links the crossing Mkey to the crossed Mkey, as an indication to network function 50 that WQEs containing the crossing Mkey are to be executed by invoking DMA engine 48, at an Mkey linking step 68. NIC 24 returns the crossing Mkey to processor 28, at an Mkey return step 70.

When the application running on host computer 22 submits a work request to transmit or receive data using the QP created at step 60, the operating system of host processor 28 posts a corresponding WQE on the QP, at a WQE posting step 72. The WQE contains the crossing Mkey that was returned to the operating system at step 70. The WQE and corresponding flow of control communications are conveyed via bus 36 to network function 50 of processing logic 40. In response to the crossing Mkey, however, processing logic 40 looks up and uses the corresponding crossed Mkey for purposes of data transfer. The processing logic then sends and receives packets via network port 52, while using the crossed Mkey in accessing the target memory region in host memory 30 via bus 38, using DMA engine 48, at a data transfer step 74.

NUMA Configurations

Figure 3:
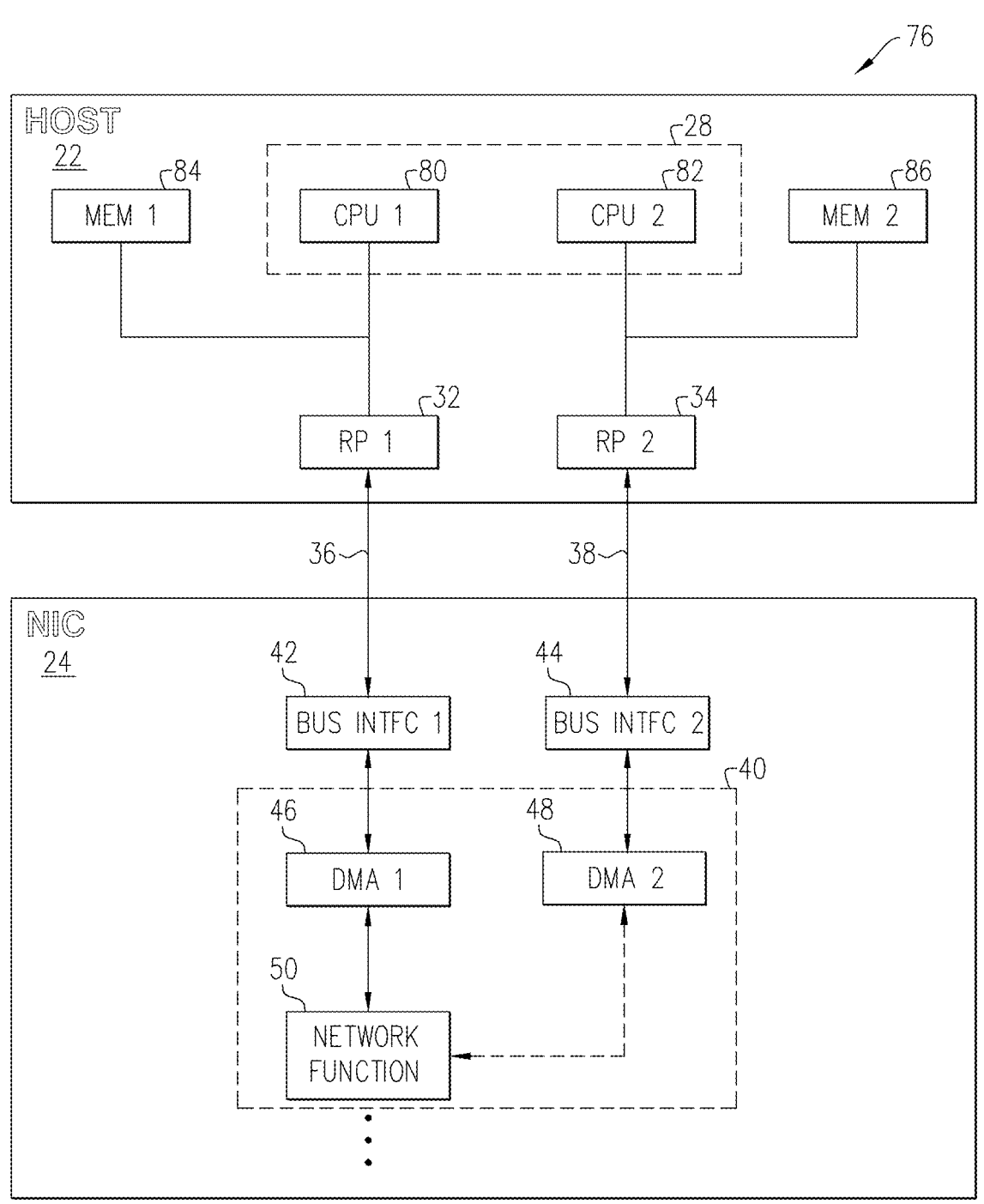
FIG. 3 is a block diagram that schematically illustrates connections between a NUMA processor and a NIC, in accordance with an embodiment of the invention.

FIG. 3 is a block diagram that schematically illustrates a computer system 76, in accordance with another embodiment of the invention. NIC 24 in this embodiment, as well as in the embodiment of FIG. 4, is identical in design and operation to the NIC shown in FIG. 1 and described above, but some details are omitted from FIGS. 3 and 4 for the sake of simplicity.

In system 76, processor 28 in host computer 22 includes at least two NUMA nodes 80, 82. Each NUMA node comprises a respective CPU, comprising one or more processing cores, and a respective local memory 84, 86. (The host memory includes at least these local memories 84, 86, possibly along with one or more shared memory banks.)

Each NUMA node 80, 82 has its own, respective root port 32 or 34. Although only two NUMA nodes and root ports are shown in FIG. 3, host computer 22 may alternatively include three or more NUMA nodes with respective root ports.

As in the preceding embodiment, host processor 28 passes communication instructions (in the form of WQEs) to packet processing logic 40 via host bus interface 42, which exposes network function 50, even when the communication transaction is to be executed on behalf of a process executing on NUMA node 82. In response to the instruction, however, packet processing logic 40 will transfer data in the communication transaction over bus 38 between host bus interface 44 and local memory 86 of NUMA node 82, using the DMA function of DMA engine 48.

Peer-To-Peer Transactions

Figure 4:
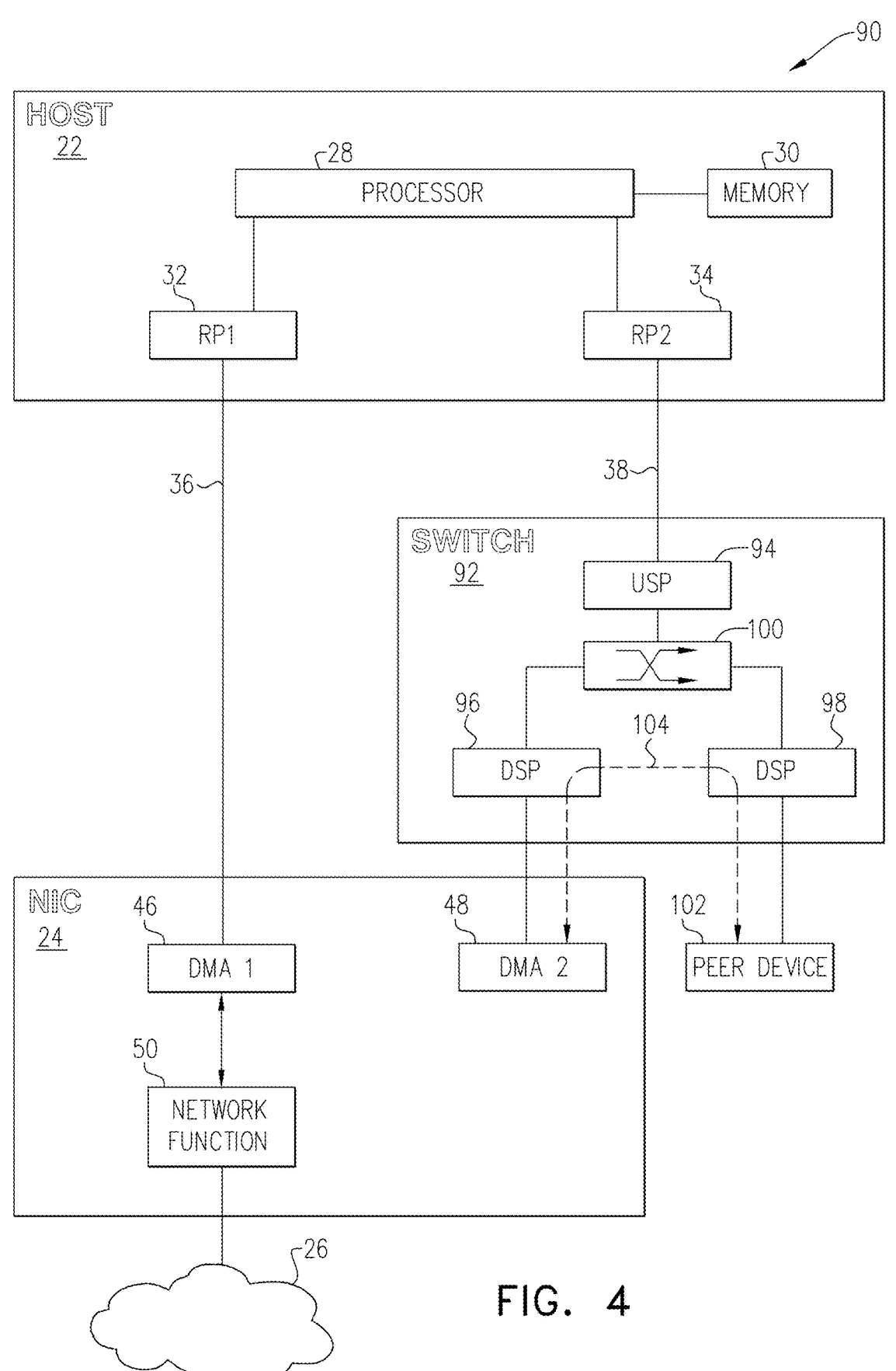
FIG. 4 is a block diagram that schematically illustrates connections between a host processor, a NIC, and a peer device, in accordance with an embodiment of the invention.

FIG. 4 is a block diagram that schematically illustrates a computer system 90, including both NIC 24 and a peer peripheral device 102, in accordance with an alternative embodiment of the invention. Peer device 102 may comprise, for example, a computational accelerator, such as a graphics processing unit (GPU) or a storage device, such as a solid-state disk (SSD). Root port 32 of host processor 28 is connected via bus 36 to DMA engine 46, which exposes network function 50, as in the preceding embodiments. (The host bus interfaces of NIC 24 are omitted for simplicity.) Root port 34 of host processor 28 connects via bus 38 to an upstream port (USP) 94 of a switch 92, such as a PCIe switch. USP 94 connects via a switching core 100 of switch 92 to a downstream port (DSP) 96, which connects to DMA engine 48, and to another DSP 98, which connects to peripheral device 102.

NIC 24 exchanges data with peer peripheral device 102 via switch 92, using DMA engine 48, over a data path 104. This data path through switch 92 is segregated from the control and data paths that are used for communication traffic over bus 36 and therefore does not compete for bus bandwidth with the communication traffic to and from network 26. Bus 38 and DMA engine 48 may still be used for transfer of communication data, as described above, to the extent that bandwidth is available via switch 92.

In another embodiment (not shown in the figures), processor 28 in system 90 includes multiple NUMA nodes, which are respectively attached to root ports 32 and 34 as in the embodiment of FIG. 3. In this case, too, one of the NUMA nodes is connected via root port 32 to DMA engine 46, exposing network function 50; while the other NUMA node is connected via root port 34 and switch 92 to DMA engine 48.

The embodiments described above are cited by way of example, and the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Network communication apparatus for connection to a computer that includes a host processor, a host memory and at least first and second root ports, the network communication apparatus comprising:

a network port, for connection to a packet communication network;

first and second host bus interfaces, for connection via respective first and second peripheral component buses to the first and second root ports, respectively; and packet processing logic, which is coupled between the network port and the first and second host bus interfaces and comprises first and second direct memory access (DMA) engines to read data from the host memory via the first and second root ports, respectively, for transmission via the network port, while exposing the network port to the host computer only through the first host bus interface, such that a physical network function for receiving and executing instructions to transmit and receive packets over the packet communication network is made available to the computer only via the first host bus interface while the second host bus interface exposes a DMA function of the second DMA engine to the host computer without exposing the network port or the physical network function.

2. The network communication apparatus according to claim 1, wherein the packet processing logic is to receive an instruction from the host processor via the first host bus interface to execute a communication transaction via the network port and to transfer data in the communication transaction between the second host bus interface and the host memory.

3. The network communication apparatus according to claim 2, wherein the instruction is contained in a work queue element (WQE) posted by the host processor in a work queue, which is associated with the first root port, and wherein the packet processing logic is to issue to the host processor a crossing memory key (Mkey), which links the work queue to a region in the host memory accessed via the second root port, for application by the host processor in posting the WQE.

4. The network communication apparatus according to claim 2, wherein the host computer includes multiple non-uniform memory access (NUMA) nodes, including first and second NUMA nodes respectively including the first and second root ports, and wherein the packet processing logic is to receive the instruction from the host processor via the first host bus interface to execute the communication transaction via the network port on behalf of a process executing on the second NUMA node.

5. The network communication apparatus according to claim 4, wherein the packet processing logic is to transfer data in the communication transaction between the second host bus interface and a local memory of the second NUMA node.

6. The network communication apparatus according to claim 1, wherein the first and second host bus interfaces support different, first and second host bus types.

7. The network communication apparatus according to claim 1, wherein the second host bus interface is to be connected to a first downstream port of a switch on the second peripheral component bus and to exchange data via the switch with a peer peripheral device connected to a second downstream port of the switch.

8. A computer system, comprising:

a computer comprising:

a host processor;

a host memory; and at least first and second root ports; and a network interface controller (NIC), comprising:

a network port, for connection to a packet communication network;

first and second host bus interfaces, for connection via respective first and second peripheral component buses to the first and second root ports, respectively; and packet processing logic, which is coupled between the network port and the first and second host bus interfaces and comprises first and second direct memory access (DMA) engines to read data from the host memory via the first and second root ports, respectively, for transmission via the network port, while exposing the network port to the host computer only through the first host bus interface, such that a physical network function for receiving and executing instructions to transmit and receive packets over the packet communication network is made available to the computer only via the first host bus interface while the second host bus interface exposes a DMA function of the second DMA engine to the host computer without exposing the network port or the physical network function.

9. The computer system according to claim 8, wherein the host processor is to submit an instruction to the packet processing logic via the first root port to execute a communication transaction via the network port and to transfer data in the communication transaction between the second root port and the host memory.

10. The computer system according to claim 9, wherein the instruction is contained in a work queue element (WQE) posted by the host processor in a work queue, which is associated with the first root port, and wherein the packet processing logic is to issue to the host processor a crossing memory key (Mkey), which links the work queue to a region in the host memory accessed via the second root port, for application by the host processor in posting the WQE.

11. The computer system according to claim 9, wherein the host computer comprises multiple non-uniform memory access (NUMA) nodes, including first and second NUMA nodes respectively including the first and second root ports, and wherein the host processor is to submit the instruction to the NIC via the first root port to execute the communication transaction via the network port on behalf of a process executing on the second NUMA node.

12. The computer system according to claim 11, wherein the packet processing logic is to transfer data in the communication transaction between the second host bus interface and a local memory of the second NUMA node.

13. The computer system according to claim 8, wherein the first and second peripheral component buses are of different, first and second host bus types.

14. The computer system according to claim 8, and comprising:

a peer peripheral device; and a switch comprising:

an upstream port connected to the second root port of the host computer;

a first downstream port connected to the second host bus interface of the NIC; and a second downstream port connected to the peer peripheral device, wherein the second DMA engine is to exchange data via the switch with the peer peripheral device.

15. A method for network communication, comprising:

connecting a network port of network interface controller (NIC) to a packet communication network;

connecting first and second host bus interfaces of the NIC via respective first and second peripheral component buses to first and second root ports, respectively, of a host computer, while exposing the network port to the host computer only through the first host bus interface, such that a physical network function for receiving and executing instructions to transmit and receive packets over the packet communication network is made available to the computer only via the first host bus interface while the second host bus interface exposes a DMA function of the second DMA engine to the host computer without exposing the network port or the physical network function; and reading data by direct memory access (DMA) via both the first and second root ports from a host memory of the host computer for transmission by the NIC via the network port.

16. The method according to claim 15, wherein reading the data comprises receiving an instruction from the host computer via the first host bus interface to execute a communication transaction via the network port and transferring data in the communication transaction between the second host bus interface and the host memory.

17. The method according to claim 16, wherein receiving the instruction comprises reading a work queue element (WQE) posted by the host computer in a work queue, which is associated with the first root port, and wherein the method comprises issuing to the host computer a crossing memory key (Mkey), which links the work queue to a region in the host memory accessed via the second root port, for application by the host computer in posting the WQE.

18. The method according to claim 16, wherein the host computer includes multiple non-uniform memory access (NUMA) nodes, including first and second NUMA nodes respectively including the first and second root ports, and wherein receiving the instruction comprises receiving the instruction from the host computer via the first host bus interface to execute the communication transaction via the network port on behalf of a process executing on the second NUMA node.

19. The method according to claim 18, wherein reading the data comprises transferring the data in the communication transaction between the second host bus interface and a local memory of the second NUMA node.

20. The method according to claim 15, wherein the first and second host bus interfaces support different, first and second host bus types.

21. The method according to claim 15, wherein connecting first and second host bus interfaces comprises connecting the second host bus interface to a first downstream port of a switch on the second peripheral component bus and exchanging data via the switch with a peer peripheral device connected to a second downstream port of the switch.

* * * * *